United States Patent Office 2,837,480
Patented June 3, 1958

2,837,480

POLYETHYLENE PHOSPHONATES AS GREASE THICKENERS

Bruce W. Hotten, Orinda, and Frederick O. Johnson, Berkeley, Calif., assignors to California Research Corporation, San Francisco, Calif., a corporation of Delaware No Drawing. Application March 31, 1955
Serial No. 498,435

10 Claims. (Cl. 252—32.5)

This patent application is directed to high melting grease compositions thickened with metal salts of certain phosphonic acids.

Grease thickening agents which are useful in the preparation of multipurpose grease compositions are continually being sought. Multipurpose greases are those which can be used in a number of services rather than merely one or two. Heretofore, it has been customary to use one particular grease for each particular service. For example, it is well known that as many as nine different types of greases have been used in the lubrication of automotive chassis. The over-all cost of greasing operations is increased by the necessity of using nine different types of greases for automotive lubrication. For example, a large inventory is required for each one of the several grease compositions, and it is time-consuming for a grease operator to change his operations from a grease gun containing one type of grease to one containing a second type of grease composition.

Present-day advances in engineering of transportation equipment have resulted in higher temperatures of operation. For example, in the lubrication of military jet aircraft engines, it is necessary for the lubricants to be stable at temperatures as high as 450° F. Also, for use in a number of services in automotive and industrial equipment, there are specifications which call for grease compositions having melting points of at least 400° F.

In addition to having high melting points, the grease compositions embodied herein are resistant to emulsification in water, and they have greater work stability and greater resistance to oxidation than the usual metal soaps of fatty acids which are so prevalently used in grease compositions at the present time.

The grease compositions set forth herein have a wide variety of applications, particularly where both water and high temperatures are encountered, such as in steel mill motors and transfer table bearings, paper mill roller bearings, automotive wheel bearings under winter and wet conditions, including use in amphibious military vehicles, high temperature cannery equipment, exposed controls of surface bearings for aircraft, etc.

According to the present invention, it has been discovered that high-melting, oxidation-resistant, and water-resistant grease compositions are obtained by the use of metal salts of polyethylene phosphonic acids as thickening agents.

The polyethylene phosphonic acids can be represented by the formula:

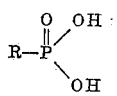

wherein R represents a polyethylene radical.

In addition to forming grease compositions which have high melting points and which are water resistant, the grease-thickening agents herein form greases which are compatible with greases thickened with other thickening agents. Two greases thickened with two different metal soaps of fatty acids are generally not compatible with each other. For example, when a calcium grease (e. g., a calcium stearate grease) and a sodium grease (e. g., a sodium stearate grease) are blended together and placed in a bearing, the grease becomes fluid after working in the bearing for only a short period of time. It is readily understood that such a condition would be detrimental to the lubrication of any machinery. The fluid blend eventually flows out of the bearing, causing bearing failure. Such is not the case, however, by the use of the greases of the present invention. By using the grease thickening agents set forth herein, it is possible to blend other grease thickening agents into the grease composition. For example, a lithium polyethylene phosphonate grease can be blended with a lithium stearate grease. When this blend is worked in a bearing, the blended grease retains its stability. Thus, the thickening agents of the present invention have an additional beneficial effect over other thickening agents.

The polyethylenes which are used in the formation of metal polyethylene phosphonates have molecular weights ranging from about 750 to about 100,000.

The metals which can be used in the formation of the metal polyethylene phosphonates of this invention include the metals of groups I, II, III, and IV of Mendeleeff's periodic table. Particular metals include lithium, sodium, potassium, silver, magnesium, calcium, zinc, strontium, cadmium, and barium. Because of the improved characteristics of the grease compositions prepared therefrom, it is preferred to use lithium and sodium.

Lubricating oils which are useful in the preparation of grease compositions of this invention include a wide variety of lubricating oils, such as naphthenic base, paraffin base, and mixed base, other hydrocarbon lubricants, e. g., lubricating oils derived from coal products, and synthetic oils, e. g., alkylene polymers (such as polymers of propylene, butylene, etc., and mixtures thereof), alkylene oxidetype polymers, dicarboxylic acid esters, liquid esters of acids of phosphorus, alkylbenzene polymers, polymers of silicon, etc. Synthetic oils of the alkylene oxide-type polymers which may be used include those exemplified by the alkylene oxide polymers (e. g., propylene oxide polymers) and derivatives, including alkylene oxide polymers prepared by polymerizing the alkylene oxides, e. g., propylene oxide, in the presence of water or alcohols, e. g., ethyl alcohol, esters of ethylene oxide-type polymers, e. g., acetylated propylene oxide polymers prepared by acetylating propylene oxide polymers containing hydroxyl groups; polyethers prepared from alkylene glycols, e. g., ethylene glycol, etc.

The polymeric products prepared from the various alkylene oxides and alkylene glycols may be polyoxyalkylene diols or polyalkylene glycol derivatives; that is, the terminal hydroxy group can remain as such, or one or both of the terminal hydroxy groups can be removed during the polymerization reaction by esterification or etherification.

Synthetic oils of the dicarboxylic acid ester type include those which are prepared by esterifying such dicarboxylic acids as adipic acid, azelaic acid, suberic acid, sebacic acid, alkenyl succinic acid, fumaric acid, maleic acid, etc., with alcohols such as butyl alcohol, hexyl alcohol, 2-ethylhexyl alcohol, dodecyl alcohol, etc. Examples of dibasic (dicarboxylic) acid ester synthetic oils include dibutyl adipate, dihexyl adipate, di-2-ethylhexyl sebacate, di-n-hexylfumaric polymer.

Synthetic oils of the alkylbenzene type include those which are prepared by alkylating benzene (e. g., dodecylbenzene, tetradecylbenzene, etc.).

Synthetic oils of the type of polymers of silicon include the liquid esters of silicon and the polysiloxanes.

The liquid esters of silicon and the polysiloxanes include those exemplified by tetraethyl silicate, tetraisopropyl silicate, tetra(methyl-2-butyl) silicate, tetra(4-methyl-2-penta) silicate, tetra(1-methoxy-2-propyl) silicate, hexyl(4-methyl-2-pentoxy) disiloxane, poly(methylsiloxane), poly(methylphenyl) siloxane, and poly(siloxyglycols), etc.

The above base oils may be used individually as such, or in various combinations, wherever miscible or wherever made so by the use of mutual solvents.

When the alkylene oxide-type polymers or polymers of silicon are the base oils, it is preferable that the grease gel structure be formed first in a hydrocarbon solvent, e. g., toluene, after which the alkylene oxide-type polymer, or the polymer of silicon is added, and the solvent removed by distillation or other means. An alcohol may be added to the hydrocarbon solvent to form a blend (e. g., a petroleum thinner and ethyl alcohol blend).

The metal salts of polyethylene phosphonic acids herein are admixed with lubricating oils in amount sufficient to form grease compositions, that is, sufficient to thicken the oils to the consistency of greases. These grease thickening agents may be incorporated in grease compositions in amounts of about 7% to about 50%. However, because the greases therefrom are of such consistency as to promote better lubrication, it is preferred to use amounts of from about 10% to 30%.

A process which can be used in preparing polyethylene phosphonic acids is described in Jensen-Clayton U. S. Patent No. 2,683,168. According to this process, a polyethylene is reacted with phosphorus trichloride in the presence of oxygen, forming the polyethylene phosphonyl dichloride, which is then hydrolyzed to yield the corresponding polyethylene phosphonic acid. The acid can then be neutralized by a metal oxide or metal hydroxide to form the desired salt.

Because the polyethylene molecule contains numerous positions onto which the phosphonate radical may become attached, it is understandable that the longer the chain length of the polyethylene molecule, the greater the possible number of reactive branched alkyl groups on that molecule. It is these branched alkyl groups with which the $PCl_3$ reacts in the presence of oxygen to form the phosphonate bond. The degree of phosphonation of any one polyethylene depends on the reaction time. The longer the time, the greater the phosphonation of any one particular polyethylene molecule.

Example 1 presented hereinbelow illustrates the preparation of polyethylene phosphonic acids.

The polyethylenes which are used in the examples hereinbelow are described as follows:

"Alathon G" is a polyethylene resin having a molecular weight of 19,000, and sold by E. I. du Pont de Nemours & Co.; "DYLT" is a polyethylene resin having a molecular weight of 12,000, and obtained from Carbide and Carbon Chemicals Corp.; and "AC" is a polyethylene having a molecular weight of 2,100, and obtained from Allied Chemical Corporation.

EXAMPLE 1.—PREPARATION OF POLYETHYLENE PHOSPHONIC ACID

A mixture of 150 grams of Alathon G and 1.5 liters of chlorobenzene was heated to 195° F. in a 2-liter glass tube having a porous gas inlet at the bottom. After 20 grams of phosphorus trichloride had been added to the viscous solution, air was bubbled through the mixture at a moderate rate for a period of 3.5 hours at temperatures ranging from 185° F. to 195° F. The resulting yellow solution was hydrolyzed over night in an equal volume of water, and the rubbery product thus obtained was water washed three times with vigorous agitation, after which the mixture was continuously washed with cold water for a period of twelve hours. The equivalent weight of the product thus obtained was 760, and the phosphorus content was 2.03%.

Based on the equivalent weight and the phosphorus content, the polyethylene contained approximately 13 phosphonic acid groups per molecule.

Table I hereinbelow presents data on further phosphonation reactions with polymers of ethylene.

*Table I*

| No. | Mol. Wt. of Polyethylene | Reaction Time, Hours | Reaction Solvent | Source of Oxygen | Equivalent Weight of Product |
|---|---|---|---|---|---|
| 1 | 2,100 | 5.0 | (1) | Oxygen | 680 |
| 2 | 12,000 | 4.5 | (1) | do | 8,000 |
| 3 | 12,000 | 1.5 | (2) | do | 750 |
| 4 | 12,000 | 2.0 | (2) | Air | 8,800 |
| 5 | 19,000 | 2.0 | (1) | do | 3,400 |
| 6 | 19,000 | 2.0 | (2) | Oxygen | 1,600 |
| 7 | 19,000 | 3.0 | (2) | Air | 12,800 |
| 8 | 19,000 | 3.5 | (2) | Oxygen | 760 |

1 1,1,2-trichloroethane.
2 Chlorobenzene.

Grease compositions were prepared by forming a solution of the desired polyethylene phosphonic acid in a base oil, after which an aqueous solution (or slurry) of a metal oxide or hydroxide was added. The resulting mixture was then heated to a temperature ranging from 450° F. to 500° F. to form a solution of the metal polyethylene phosphonate in oil. As this solution was cooled, a grease structure was formed.

Table II hereinbelow sets forth data of grease compositions thickened by metal salts of polyethylene phosphonic acids. The base oil used was a California naphthenic base oil having a viscosity of 450 SSU at 100° F.

*Table II*

| No. | Metal | Mol. Wt. of Polyethylene | Percent P of Polyethylene Phosphonic Acid (Percent by Wt.) | Equiv. Wt. of Polyethylene Phosphonate | Percent of Soap in Grease | ASTM Dropping Pt., °F. | Penetration Unworked | Penetration Worked |
|---|---|---|---|---|---|---|---|---|
| 1 | Lithium | 19,000 | 1.94 | 640 | 15.0 | 500+ | 236 | 271 |
| 2 | do | 19,000 | | 3,400 | 10.0 | 472 | 242 | 265 |
| 3 | do | 12,000 | 2.23 | 8,000 | 15.0 | 478 | 179 | 211 |
| 4 | do | 12,000 | 0.17 | 8,000 | 10.0 | 421 | 236 | 275 |
| 5 | do | 12,000 | 0.17 | 8,000 | 8.0 | 275 | 336 | 360 |
| 6 | do | 2,100 | 2.23 | 680 | 15.0 | 500+ | | 240 |
| 7 | Sodium | 2,100 | 0.92 | 1,600 | 8.8 | 500+ | 321 | 326 |
| 8 | do | 12,000 | 0.17 | 8,800 | 10.0 | 203 | 350 | 380 |
| 9 | do | 12,000 | 1.8 | 750 | 9.0 | 370 | 239 | 265 |

As noted hereinabove, the metal polyethylene phosphonates of the present invention can be used in combination with other metal soaps, such as the metal soaps of fatty acids in thickening lubricating oils to the consistency of greases. Furthermore, the work stability of grease compositions thickened with a combination of metal polyethylene phosphonates and metal salts of fatty acids is greater than that of greases thickened only with metal salts of fatty acids.

The grease compositions containing a combination of thickening agents were prepared in a manner exemplified by that of Example 2 hereinbelow.

EXAMPLE 2.—PREPARATION OF GREASE THICKENED WITH LITHIUM STEARATE AND LITHIUM POLYETHYLENE PHOSPHONATE

A mixture of 7.5 grams of a polyethylene phosphonate prepared from "AC" polyethylene (defined hereinabove), 22.5 grams of stearic acid, and 170 grams of a California solvent-refined paraffin base oil having a viscosity of 450 SSU at 100° F. was charged to a beaker and heated to 360 F. After the slurry had been cooled to 210° F., 3.75 grams of lithium hydroxide monohydrate was added, after which the mixture was heated with agitation to 450° F. As the mixture was cooled, a grease structure was formed.

The properties of greases prepared from blends of greases thickened with lithium stearate and with lithium polyethylene phosphonate are set forth in Table III hereinbelow.

The work stability test data were obtained by packing No. 206 shielded ball bearings with the greases to be tested, then rotating the packed bearings at 3450 R. P. M. for 30 minutes at room temperature, after which the ASTM penetration values at 77° F. were obtained.

*Table III*

| No. | Mol. Wt. of Polyethylene used in Phosphonate Preparation | Weight Ratio of Stearate to Phosphonate | Total Thickener, Wt. Percent | ASTM Dropping Point, ° F. | ASTM Penetration at 77° F. | | |
|---|---|---|---|---|---|---|---|
| | | | | | Unworked | Worked | After Work Stability Test |
| 1 | 19,000 | 3:1 | 15.0 | 406 | 159 | 230 | 226 |
| 2 | 2,100 | 3:1 | 15.0 | 380 | 188 | 240 | 235 |
| 3 | 2,100 | 3:1 | 15.0 | 394 | 292 | 368 | 249 |
| 4 | 2,100 | 3:2 | 10.0 | 494 | 231 | 318 | -------- |
| 5 | ----------- | (¹) | 15.0 | 380 | 146 | 200 | 355 |

¹ Lithium stearate was the sole thickener.

When 15% of lithium stearate was incorporated in a grease composition as the sole thickening agent, the ASTM dropping point was 380° F.; the ASTM unworked penetration at 77° F. was 146; and the ASTM worked penetration at 77° F. was 200.

Besides being excellent thickening agents for lubricating oils, the thickening agents of this invention are suitable as agents in pigment manufacture, in dusting powders, in such materials as leather, textiles, wood, and other fibrous or porous materials, for imparting greater water resistance, etc. Also, the thickening agents herein are useful as gelling agents for plastigels.

In addition to the agents noted herein, the grease composition of this invention may contain oxidation inhibitors (e. g., dihydroxy anthraquinones, metal organo dithiophosphates, etc.), rust inhibitors (e. g., metal petroleum sulfonates), lubricity agents (e. g., aromatic phosphates), color correctors, stringiness agents, etc.

We claim:

1. A grease composition comprising an oil of lubricating viscosity and, in an amount sufficient to thicken said oil to the consistency of a grease, an alkali metal polyethylene phosphonate, wherein the polyethylene radical has a molecular weight ranging from about 750 to about 100,000.

2. A grease composition comprising a major proportion of an oil of lubricating viscosity and, in an amount sufficient to thicken said oil to the consistency of a grease, an alkali metal salt of a polyethylene phosphonic acid of the formula:

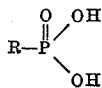

wherein R is a polyethylene radical having a molecular weight ranging from about 750 to about 100,000.

3. A grease composition comprising a major proportion of an oil of lubricating viscosity and from about 7% to about 50% of an alkali metal salt of a polyethylene phosphonate, wherein the polyethylene radical has a molecular weight of about 750 to about 100,000.

4. A grease composition comprising a major porportion of an oil of lubricating viscosity and from about 7% to about 50% of an alkali metal polyethylene phosphonate containing at least one phosphonate radical per polyethylene radical, wherein the polyethylene radical has a molecular weight ranging from about 750 to about 100,000.

5. A grease composition comprising a major proportion of an oil of lubricating viscosity and from about 10% to about 30% of an alkali metal polyethylene phosphonate containing at least one phosphonate radical per polyethylene radical, wherein said polyethylene radical has a molecular weight ranging from about 750 to about 100,000.

6. A grease composition comprising a major proportion of an oil of lubricating viscosity, and from about 5% to about 50%, by weight, of an alkali metal salt of a polyethylene phosphonate of the formula:

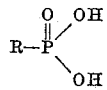

wherein R is a polyethylene radical having a molecular weight ranging from about 750 to about 100,000.

7. A grease composition comprising a major proportion of an oil of lubricating viscosity and, in an amount sufficient to thicken said oil to the consistency of a grease, a lithium polyethylene phosphonate, wherein the polyethylene radical has a molecular weight ranging from about 750 to about 100,000.

8. A grease composition comprising a major proportion of an oil of lubricating viscosity and, in an amount sufficient to thicken said oil to the consistency of a grease, a sodium polyethylene phosphonate, wherein the polyethylene radical has a molecular weight ranging from about 750 to about 100,000.

9. A grease composition comprising a major proportion of an oil of lubricating viscosity, and from about 5% to about 50%, by weight, of a lithium salt of a polyethylene phosphonate of the formula:

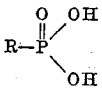

wherein R is a polyethylene radical having a molecular weight ranging from about 750 to about 100,000.

10. A grease composition comprising a major proportion of an oil of lubricating viscosity, and from about 5% to about 50%, by weight, of a sodium salt of a polyethylene phosphonate of the formula:
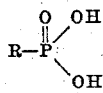
wherein R is a polyethylene radical having a molecular weight ranging from about 750 to about 100,000.
References Cited in the file of this patent
UNITED STATES PATENTS
2,628,949    Butcosk _____ Feb. 17, 1953
2,683,168    Jensen et al. _____ July 6, 1954